United States Patent [19]

Ophey

[11] Patent Number: 5,608,708
[45] Date of Patent: Mar. 4, 1997

[54] OPTICAL BEAM-SPLITTING ELEMENT

[75] Inventor: Willem G. Ophey, Eindhoven, Netherlands

[73] Assignee: U.S. Philips Corporation, New York, N.Y.

[21] Appl. No.: 488,323

[22] Filed: Jun. 7, 1995

[30]   Foreign Application Priority Data

Jun. 7, 1994 [EP] European Pat. Off. ............ 94201608

[51] Int. Cl.⁶ .................................................. G11B 7/00
[52] U.S. Cl. ....................... 369/109; 369/103; 369/44.12; 359/558; 250/201.5
[58] Field of Search ..................................... 369/103, 109, 369/118, 120, 121, 112, 44.12, 44.11; 359/485, 558, 566, 569; 250/201.5

[56]   References Cited

U.S. PATENT DOCUMENTS

| | | | |
|---|---|---|---|
| 3,876,842 | 4/1975 | Bouwhuis | 179/100.41 L |
| 4,358,200 | 11/1982 | Heemskerk et al. | 356/123 |
| 4,924,079 | 5/1990 | Opheij et al. | 250/201.5 |
| 5,105,403 | 4/1992 | Kando et al. | 369/44.12 |
| 5,257,131 | 10/1993 | Yoshida et al. | 359/485 |
| 5,317,551 | 5/1994 | Shiono | 369/44.12 |
| 5,416,765 | 5/1995 | Aikoh et al. | 369/112 |
| 5,465,247 | 11/1995 | Kobayashi | 369/109 |

FOREIGN PATENT DOCUMENTS

| | | |
|---|---|---|
| 0583036 | 2/1994 | European Pat. Off. . |
| 0605923 | 7/1994 | European Pat. Off. . |
| 135737 | 2/1989 | Japan . |

OTHER PUBLICATIONS

M. G. et al, "Het systeem 'Compact Disc Digital Audio'", Philips Techn T. 40, 82, No. 9, 1981, pp. 267–272.

*Primary Examiner*—Loha Ben
*Attorney, Agent, or Firm*—Arthur G. Schaier

[57] ABSTRACT

A one-piece element for splitting part of the radiation of an incident beam, to form a sub-beam having a different direction. The element includes a mirror for reflecting the sub-beam at an increased angle with respect to the direction of the incident beam. The element is preferably a homogeneous molding, with an internally reflecting mirror.

16 Claims, 2 Drawing Sheets

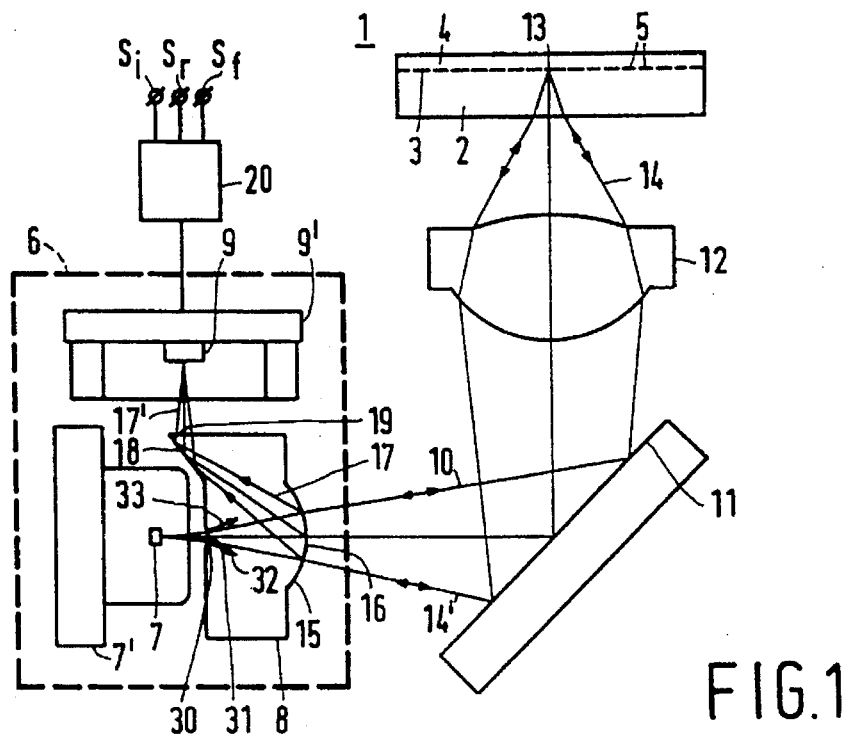
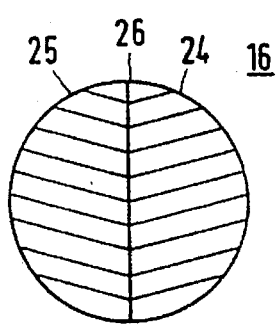
FIG.2a
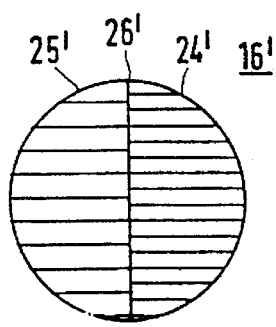
FIG.2b
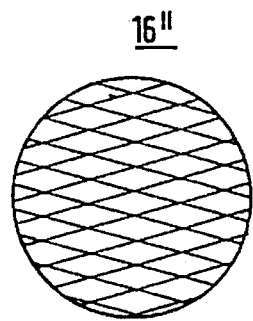
FIG.2c
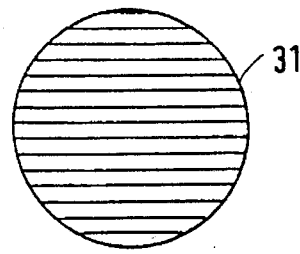
FIG.3

OPTICAL BEAM-SPLITTING ELEMENT

CROSS-REFERENCE TO RELATED APPLICATIONS

This application is related to concurrently filed patent application Ser. No. 08/488,312 by Willem G. Ophey and Josephus J. M. Braat for Optical Beam Shaper, and Radiation Source Unit and Scanning Device Including said Beam Shaper.

BACKGROUND OF THE INVENTION

The invention relates to an optical beam-splitting element having a first surface which is provided with a grating for generating a sub-beam having a second direction from a radiation beam incident on the first surface and having a first direction. The invention also relates to a radiation source unit comprising such an element and to an optical scanning unit comprising such a radiation source unit.

The direction of a beam is defined as the direction of the chief ray of the beam.

An element of this type is known from European Patent Application no. 0 583 036 in which it has been described as a component of an optical scanning unit. A radiation source in the scanning unit supplies a radiation beam which is focused by an objective lens to a scanning spot on an optical record carrier. The beam-splitting element, which is traversed by the radiation beam from a second surface to a first surface, is arranged between the radiation source and the objective lens. The radiation reflected by the record carrier traverses the same path as the radiation beam from the radiation source and forms the above-mentioned beam having a first direction and being incident on the beam-splitting element. A grating on the first surface of the beam-splitting element splits a part of the radiation of the incident beam in the form of a sub-beam having a second direction. The sub-beam converges on a detection system arranged next to the radiation source, which detection system generates, inter alia a signal from the incident radiation, which signal represents the stored information.

A drawback of the known beam-splitting element is the small angle between said first and second directions, which necessitates a relatively small distance between the radiation source and the detection system. If the radiation source and the detection system are two separate components, it is difficult to arrange them in the scanning unit at such a short distance from each other.

SUMMARY OF THE INVENTION

It is an object of the present invention to provide a beam-splitting element which meets the above-mentioned drawback, and to provide a radiation source unit which is flexible enough for said components to be arranged.

According to the invention, this object is achieved by a beam-splitting element as described in the opening paragraph and is characterized in that it further comprises a mirror for changing the direction of the sub-beam from the second direction to a third direction, the angle between the first and the second direction being smaller than the angle between the first and the third direction.

An increase of the deflection angle between the first and the second direction by means of reducing the period of the grating lines of the grating could be considered as a possibility of increasing the distance between the radiation source and the detection system. The invention is based on the recognition that this has its drawbacks. First, the requirements imposed on the grating increase with an increasing deflection angle so that the grating is more difficult to realise. Secondly, the cross-section of the sub-beam becomes more elliptic with an increasing deflection angle, which degrades the quality of the scanning spot formed on the detection system, hence the quality of the signals generated by the system. Thirdly, with an increasing deflection angle, the tolerances for arranging the grating with respect to the radiation source and the detection system will be narrower so that it will be more difficult to arrange the components, while a greater mechanical stability is required. The mirror according to the invention increases the angle between the sub-beam and the incident beam without the three drawbacks mentioned above.

A very suitable embodiment of the beam-splitting element according to the invention is characterized in that it has an exit surface in the path of the sub-beam and in that the mirror is located in the path of the sub-beam between the first surface and the exit surface. The mirror then forms an integrated component of the element so that the first surface, the exit surface and the mirror can be formed as a single homogeneous piece in a single process step, for example by means of plastic injection moulding.

The mirror is preferably internally reflecting so that it is not necessary to provide a reflective layer on a part of the beam-splitting element.

The angle between the first and the third direction is preferably approximately 90°. The radiation source and the detection system then have a relatively large mutual distance, while nevertheless a compact arrangement having a satisfactory mechanical stability is obtained.

In addition to its function of splitting a part of the radiation of the incident beam, the grating on the first surface preferably also has the function of forming the sub-beam in such a way that it is suitable for generating signals comprising information about tracking and focus error of the scanning spot on the record carrier. To this end the grating may comprise, for example sub-gratings at both sides of a dividing line, or overlapping sub-gratings.

A particular embodiment of the beam-splitting element according to the invention has a second surface located in the path of the incident beam, which surface is provided with a grating having parallel grating lines for forming two further sub-beams from the radiation beam emitted by the radiation source, which futher sub-beams are used for generating the tracking signals.

In an advantageous embodiment of the beam-splitting element according to the invention, at least one of the surfaces has optical power. In this way the beam-splitting element also acquires the function of a collimator lens for the radiation beam or a beam shaper.

The properties of the beam-splitting element are optimally used when the element is arranged in a radiation source unit which further comprises a radiation source and a detection system. This radiation source unit not only has a compact construction and great mechanical stability but also the great advantage that it is suitable for incorporating different types of radiation sources and detection systems.

The invention further relates to an optical scanning device for scanning an information plane, which device comprises such a radiation source unit and an objective system for focusing the radiation beam supplied by this unit to form a scanning spot on the information plane, and in which the detection system is arranged in the radiation source unit for converting radiation in the sub-beam from the information plane into an electric signal representing information stored in the information plane.

These and other aspects of the invention will be apparent from and elucidated with reference to the embodiments described hereinafter.

BRIEF DESCRIPTION OF THE DRAWING

In the drawings

FIG. 1 shows an optical scanning unit according to the invention, including a beam shaper, FIGS. 2a, b, c show some gratings arranged on beam-splitting elements according to the invention, FIG. 3 shows a three-beam grating arranged on the beam-splitting elements according to the invention.

DESCRIPTION OF THE PREFERRED EMBODIMENT

Figure 4:
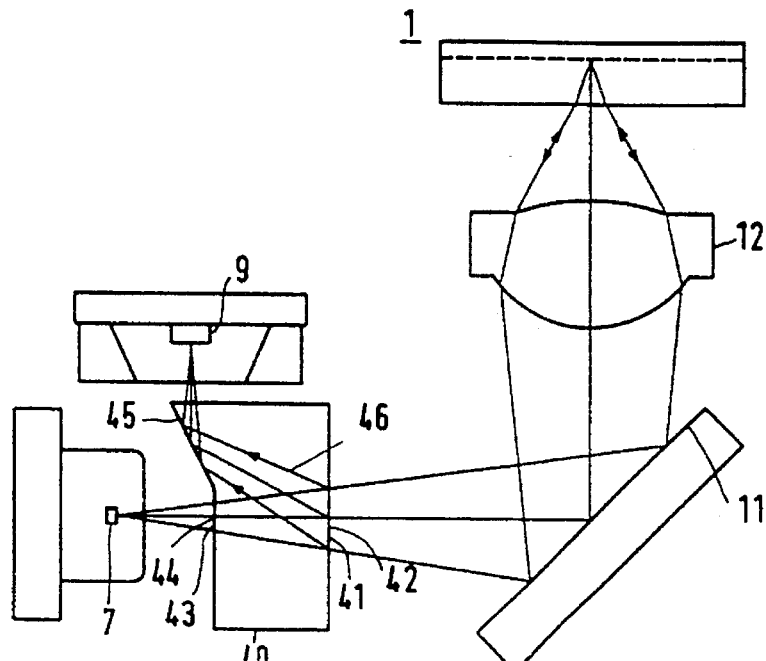
FIG. 4 shows an optical scanning unit according to the invention.

FIG. 1 shows diagrammatically a device for optically scanning an information plane of an optical record carrier 1. Scanning is herein understood to mean scanning for both writing and reading information. The information plane may be a prerecorded layer or a layer which can be provided entirely or partly with information. The record carrier 1, a part of which is shown in a radial cross-section in FIG. 1, comprises a transparent substrate 2, a reflecting information plane 3 and a coating 4. The information plane is divided into a large number of tracks 5 in which information is recorded or can be inscribed in the form of information areas (not shown) which are optically distinguished from their surroundings.

The scanning device comprises a radiation source unit 6 which, according to the invention, is provided with a housing 7' accommodating a diode laser 7, a beam shaper 8 for changing the shape of the cross-section of the radiation beam which is incident on the beam shaper and a housing 9' accommodating a detection system 9. The diode laser and the detection system are separate components so that it is easy to replace one of the components by a component of another type, while the other component can remain unchanged. The elliptical cross-section of the beam coming from the diode laser is mainly rendered circular by the beam shaper. This radiation source unit then supplies a beam 10 having a stable wavefront and an intensity which represents a large part of the intensity produced by the diode laser. The radiation source unit is thus very suitable for a writing device with which information can be written, for example ablatively, by surface deformation or by a magneto-optical process. During writing the beam 10 is modulated, for example by means of an acousto-optical modulator or by modulating the electric current through the diode laser.

The radiation beam 10 having a circular cross-section has such an angular aperture that it optimally fills an objective system 12 via a folding mirror 11, so that this system forms a diffraction-limited scanning spot 13 on the information plane. An information track can be scanned by rotating the record carrier. All information tracks can be scanned by moving the record carrier 1 with respect to the scanning spot 13 in the radial direction.

The information plane reflects the radiation in a beam 14 which traverses the objective system again and is incident as beam 14' on a first surface 15 of the beam shaper 8. To separate this returning beam 14 spatially from the on-going radiation beam 10, the first surface is provided with a separating grating 16 which deflects a part of the incident beam 14' by way of diffraction in the form of a sub-beam 17 towards the detection system 9. The beam shaper thus has the function of a beam-splitting element. The incident beam has a first direction and the sub-beam has a second direction. The angle between these directions cannot be chosen to be too large because the period of the grating lines of the separating grating 16 will become very small with an increasing deflection angle so that the grating is difficult to realise, while the position tolerances of the grating will become small. For these reasons the angle preferably ranges between 20° and 35°. On the other hand, the angle must be as large as possible so as to have a reasonable distance between the radiation source 7 and the detection system 9, so that their housings 7' and 9' are not in each other's way and there is sufficient space to align each component separately. According to the invention, this problem is solved by guiding the sub-beam 17 towards the detection system 9 via a mirror 18. The mirror changes the sub-beam 17 having the second direction into a sub-beam 17' having a third direction. The magnification of the angle between the sub-beam 17' and the incident beam 14' by the mirror does not lead to the above-mentioned drawbacks. The mirror 18 may be a separate component of the beam shaper 8. However, the mirror 18 preferably forms an integral part of the beam shaper 8. In that case the mirror is arranged in the optical path of the sub-beam 17 through the beam shaper between the first surface 15 and the exit surface 19 of the beam shaper. At a suitable choice of the angle of incidence on the mirror and of the refractive index of the material of the beam shaper, the mirror is totally internally reflecting so that it is not necessary to provide the mirror surface with a reflective coating.

The compact arrangement of the radiation source 7, the beam shaper 8 with the separating grating 16 and the detection system 9 ensures a great position stability. The angle between the first and the third direction is preferably 90° so that the housings 7' and 9' are perpendicular to each other.

During reading, a parameter of the reflected beam, for example the intensity or the direction of polarization, is modulated in accordance with the information stored in the succession of information areas. The detection system 9 converts this modulation into an electric signal. The detection system generally comprises a plurality of detector elements so that it supplies a plurality of output signals which are processed in a signal processing circuit 20 to an information signal $S_i$, a tracking error signal $S_r$ and a focus error signal $S_f$ for a tracking servosystem and a focus servosystem.

For further details of the scanning device reference is made to the article "Het systeem 'Compact Disc Digital Audio'" by M. G. Carasso, J. B. H. Peek and J. P. Sinjou in Philips Technisch Tijdschfift 40, pp. 267–272, 1981–82, no. 9.

The separating grating 16 may have different shapes, dependent on the configuration of the detectors in the detection system 9 and on the way in which the different signals are derived from the output signals of the detectors. The separating grating may comprise two sub-gratings 24, 25 at both sides of a dividing line 26, while the grating lines in each sub-grating have the same period and extend at equal but opposite angles to the dividing line, as is shown in FIG. 2a. This grating is suitable for forming the focus error signal by means of the single or double-Foucault method and the tracking error signal by means of the two-beam method or the two or three-beam push-pull methods. The grating and the associated detector configuration are known, inter alia from U.S. Pat. No. 4,924,079. Another embodiment of the separating grating 16' is shown in FIG. 2b. This grating also comprises two sub-gratings 24', 25' at both sides of a dividing line 26', but the grating lines in the sub-gratings have different periods, as is known from, for example European Patent Application no. 0 583 036. A third embodiment of the separating grating 16", shown in FIG. 2c, comprises two overlapping or interleaving sub-gratings which have either equal or different optical powers, while the grating lines mutually extend at an angle of between 0° and 90°. Such a grating is suitable for determining the focus error by means of the beam size method as is known from Japanese Patent Application no. 1-35 737 (A). By varying the period of the grating lines of the sub-gratings across the sub-gratings, the sub-gratings acquire optical power so that the vergence of the sub-beams formed differs from the beam from which they have been formed. With a special variation of the period and possibly a curvature of the grating lines, it is possible to introduce astigmatism into the sub-beams so that the focus error signal can be formed by means of the astigmatic method which is known, inter alia from U.S. Pat. No. 4,358,200.

In the scanning device shown in FIG. 1 the beam of the diode laser 7 is incident on a second surface 30 of the beam shaper. This second surface may be provided with a grating 31 for generating two sub-beams 32 and 33, only a small part of which is shown for the sake of clarity. These two sub-beams supply two side spots at both sides of the scanning spot 13 on the information plane 3. The radiation reflected therefrom can be detected in the detection system 9 for generating the tracking signal $S_r$ in accordance with the three-beam method known from, inter alia U.S. Pat. No. 3,376,842. The grating 31 is known as a three-beam grating as shown in FIG. 3 and has substantially straight, parallel grating lines. To avoid vignetting of the sub-beams 32 and 33 through the objective system 12, the distance between the diode laser 7 and the three-beam grating 31 should not be too small. A distance of 1 to 2 mm only yields a small vignetting, while the positioning stability of the grating with respect to the radiation source is within the required tolerance limits.

The beam shaper 8 is used for reducing the ellipticity of the cross-section of the radiation beam from the diode laser 7. The second surface 30 of the beam shaper is provided with a mainly cylindrical portion having a cylindrical axis. This portion has an angular magnification of the order of $n_1/n_2$ in a transversal plane (YZ-plane) and an angular magnification of the order of $n_2/n_1$ in a lateral plane (XZ-plane), in which the transversal plane and the lateral plane are perpendicular to each other and intersect each other along the optical axis (Z-axis) of the beam shaper, and the cylindrical axis is located in the transversal plane. The parameters $n_2$ and $n_1$ are the refractive indices of the element material and the surrounding medium, respectively. The first surface 15 is toroidal. The beam shaper is entirely made of the synthetic material polycarbonate (PC) and has the following parameter values:

distance to the diode laser $Z_1$=2.0 mm, including a 0.25 mm thick coating glass with n=1.514 for the laser.

curvature of the second surface 30:
  in the XZ-plane $C_{1x}$ =−2.032 mm$^{-1}$ and slightly aspherical;
  in the YZ-plane $C_{1y}$ =−0.020 mm$^{-1}$.

thickness D=2.70 mm.

curvature of the first surface 15:
  in the XZ-plane $C_{2,x}$ =−0.434 mm$^{-1}$;
  in the YZ-plane $C_{2,y}$ =−0.166 mm$^{-1}$ and slightly aspherical.

The beam shaper shapes a beam with NAs of 0.10 and 0.20 in two mutually perpendicular directions so as to obtain an exit beam having a circularly symmetrical cross-section and a NA of 0.15. Other embodiments of the beam shaper are described in the non-prepublished European Patent Application no. 93203681.7. If the first surface 15 of the beam shaper has more optical power than in the embodiment described above, it may also function as a collimator lens so that the beam shaper gives the beam from the diode laser a circular cross-section and collimates as well.

In the scanning device shown in FIG. 1 the functions of the beam-splitting element and the beam shaper are united in a single component. However, it is possible to use the beam-splitting element according to the invention without the function of a beam shaper. FIG. 4 shows a scanning device according to the invention, including such a beam-splitting element 40. The element has a first flat surface 41 with a separating grating 42 and a second, similarly flat surface 43 with a three-beam grating 44. A mirror 45 according to the invention is arranged in the path of a sub-beam 46 formed by the separating grating 42. The mirror is integrated with the beam-splitting element.

Figure 5:
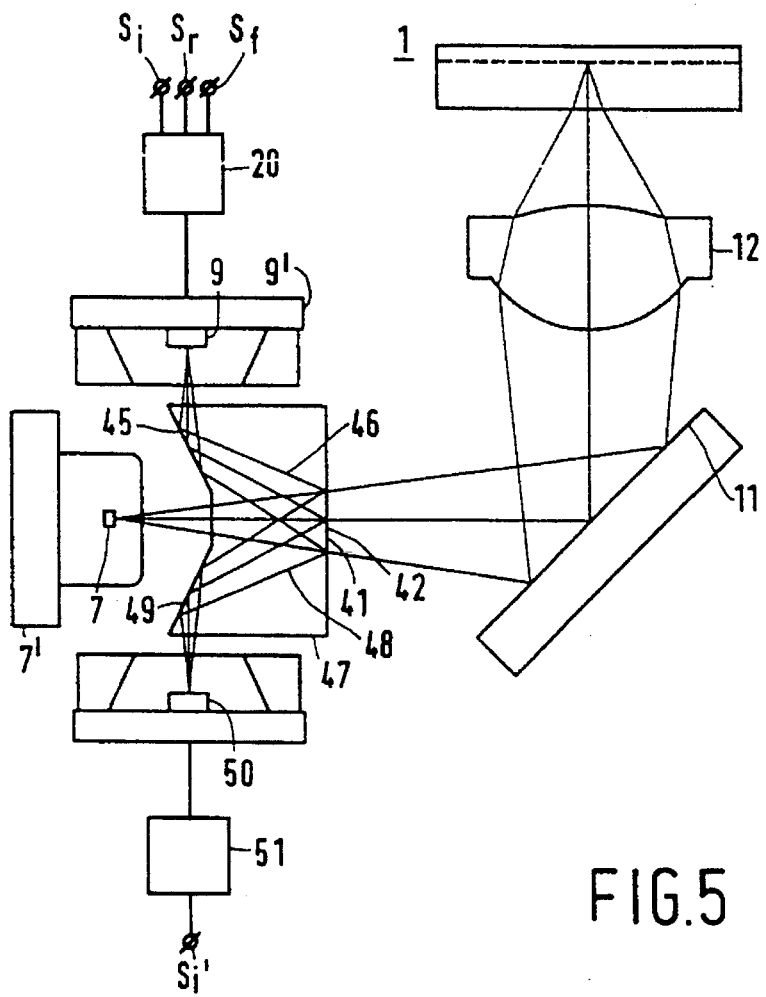
FIG. 5 shows an optical scanning unit according to the invention, including two detection systems.

FIG. 5 shows a scanning device according to the invention in which a second sub-beam 48 formed by the separating grating 42 is guided towards a second detection system 50 via a second mirror 49 in the same way as the sub-beam 46. The direction of this second sub-beam extends at an equal but opposite angle to the direction of the beam 10 as compared with the direction of the sub-beam 46. An information signal $S_i'$, which may be used to improve the signal quality of the information signal $S_i$ of the detection system 9, can be derived from the output signals of the second detection system via a signal processing circuit 51. Since the scanning spot formed by the sub-beam 48 on the detection system 50 has a less satisfactory quality than that of the sub-beam 46 on the detection system 9, the servosignals $S_r$ and $S_f$ are preferably derived from the output signals of the detection system 9. The gratings 42 and 44 may be implemented in the same way as the grating 16 and 31, respectively, described above.

It will be evident from the foregoing that the beam-splitting element may also include the function of a plano-convex or biconvex collimator lens. The beam-splitting element may not only be used in optical scanning devices for record carriers, but in all optical devices such as, for example laser printers in which a part of an ongoing beam must be split, inter alia for detecting the intensity in the on-going beam.

I claim:

1. An optical beam-splitting element comprising a first surface having a grating for generating a sub-beam having a second direction from a radiation beam incident on the first surface and having a first direction, and a mirror for changing the direction of the sub-beam from the second direction to a third direction, wherein the angle between the first and the second direction is smaller than the angle between the first and the third direction.

2. An optical beam-splitting element as claimed in claim 1, and including an exit surface in the path of the sub-beam; the mirror being located in the path of the sub-beam between the first surface and the exit surface.

3. An optical beam-splitting element as claimed in claim 1, wherein the mirror is totally internally reflecting.

4. An optical beam-splitting element as claimed in claim 1, wherein the angle between the first and the third direction is substantially 90°.

5. An optical beam-splitting element as claimed in claim 1, wherein the grating comprises two sub-gratings.

6. An optical beam-splitting element as claimed in claim 1, and including a second surface located in the path of the incident beam, the second surface being provided with a grating having parallel grating lines.

7. An optical beam-splitting element as claimed in claim 1, and including a second surface located in the path of the incident beam, wherein at least one of the first and second surfaces has optical power.

8. An optical beam-splitting element as claimed in claim 7, wherein the first surface and the second surface have a common optical axis and the second surface includes a substantially cylindrical portion having a cylindrical axis, said portion having an angular magnification of the order of $n_1/n_2$ in a transversal plane and an angular magnification of the order of n2/n1 in a lateral plane, and wherein the transversal plane and the lateral plane are perpendicular to each other and intersect each other along the optical axis, and the cylindrical axis is located in the transversal plane, and in which $n_2$ and $n_1$ are the refractive indices of the element material and the surrounding medium, respectively, and in that the first surface is a toroidal surface.

9. An optical beam-splitting element as claimed in claim 1, wherein said element is formed as a single homogeneous piece.

10. An optical beam-splitting element as claimed in claim 9, wherein said element is a plastic molding.

11. A radiation source unit comprising a diode laser for generating a radiation beam having a first direction; an optical beam-splitting element having a first surface on which the radiation beam is incident, and being provided with a grating for generating a sub-beam having a second direction different from the first direction; and a radiation-sensitive detection system arranged in the path of the sub-beam, the optical beam-splitting element comprising a mirror for changing the direction of the sub-beam from the second direction to a third direction different from the first direction, the angle between the first direction and the second direction being smaller than the angle between the first direction and the third direction.

12. A radiation source unit as claimed in claim 11, wherein said element is formed as a single homogeneous piece.

13. A radiation source unit as claimed in claim 12, wherein said element is a plastic molding.

14. An optical scanning device for scanning an information plane, comprising a radiation source unit comprising a diode laser for generating a radiation beam having a first direction; an optical beam-splitting element having a first surface on which the radiation beam is incident, and being provided with a grating for generating a sub-beam having a second direction different from the first direction; a radiation-sensitive detection system arranged in the path of the sub-beam; and an objective system for focusing the radiation beam supplied by the unit to form a scanning spot on the information plane, the detection system being arranged in the unit for converting radiation in the sub-beam reflected from the information plane into an electric signal representing information stored in the information plane, wherein the element comprises a mirror for changing the direction of the sub-beam from the second direction to a third direction different from the first direction, the angle between the first direction and the second direction being smaller than the angle between the first direction and the third direction.

15. A radiation source unit as claimed in claim 14, wherein said element is formed as a single homogeneous piece.

16. A radiation source unit as claimed in claim 15, wherein said element is a plastic molding.

* * * * *